UNITED STATES PATENT OFFICE.

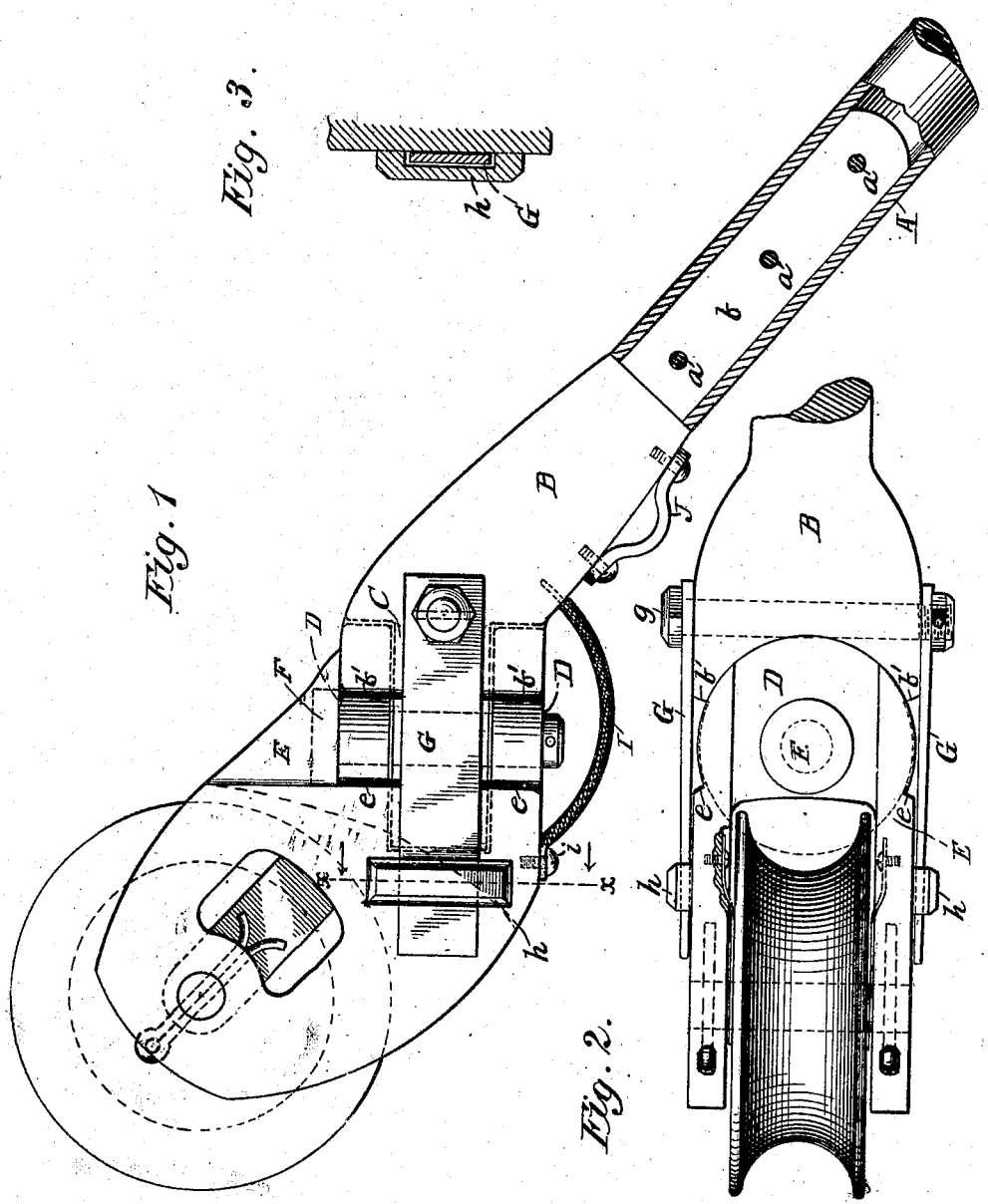

GARRET MOTT, OF NEW YORK, N. Y., AND ADOLPH G. KOENIG, OF WEEHAWKEN, NEW JERSEY.

TROLLEY-POLE HEAD.

No. 885,776.

Specification of Letters Patent.

Patented April 28, 1908.

Application filed April 25, 1907. Serial No. 370,156.

*To all whom it may concern:*

Be it known that we, GARRET MOTT and ADOLPH G. KOENIG, citizens of the United States, and residing, respectively, at New York, N. Y., and Weehawken, New Jersey, have invented new and useful Improvements in Trolley-Pole Heads, of which the following is a specification.

Our invention relates to improvements in the end or head of the trolley pole in which is mounted the trolley wheel for taking the current from an overhead wire, and consists in a laterally-yielding, spring-controlled mounting for the trolley wheel, as is hereinafter fully set forth.

In the drawings Figure 1 is a side elevation of our improved device; Fig. 2 is a top view of the same in the position shown in Fig. 1, the lower end of the shank being broken off; and Fig. 3 is a sectional detail of one of the springs and spring-guides taken on the line X X of Fig. 1 looking in the direction of the arrows.

The same parts are referred to by the same letters in all the figures.

A is the upper end, partly in section, of a tubular trolley pole.

B is a shank provided at its lower end with a reduced extension $b$ adapted to be slipped into the end of the trolley pole A and to be secured therein by rivets $a$, $a$, or by other suitable fastenings. The shank B is provided at its upper end with a male hinge-member C which is held between the female hinge-members D D of the wheel fork E by the pivot pin F. The trolley fork E is provided with shoulder stops $e$, $e$, adapted to engage with the similar stops $b'$ $b'$ on the shank B when the trolley fork is swung to either side upon its pivot pin F through the arc between the stops $e$ and $b'$.

The trolley wheel is journaled back of and above the hinged joint, but so near thereto that the extended perpendicular line of the pivot pin will pass in close proximity to the forward edge of the trolley wheel. And the side stops are so placed that the wheel cannot swing far enough to either side of a wire which has only normal lateral variations as to assume such a transverse relation thereto that the edge flanges of the wheel will throw the wire out of the wheel's groove. This insures the retaining of the trolley head in such a position that whenever the trolley pole is swung under a normally strung wire the trolley wheel groove will be in a position to receive and hold the wire, which it could not do if it could swing too far to one side or the other, as, for instance, to an angle of forty five degrees, or still further around.

G G are flat springs bolted to the shank B by the bolt $g$, and having their ends passing freely through the loops or guides $h$, $h$, on the sides of the trolley fork E.

I is an insulated conductor for insuring the passage of the current past the hinge. And this conductor is preferably detachably secured at one end, as at $i$, so that it can be readily released if it is desired to separate the parts of the trolley head.

J is a loop for securing a rope to the trolley pole.

This construction results in a trolley head wherein the trolley fork has a spring-controlled movement through a limited arc to either side, being held, however, normally, in line with the trolley pole by the side springs G G, but being free to yield to either side to accommodate itself to irregularities in the wire or lateral movements of the car, without being driven off the wire or brought into such a transverse position on the wire that it will unduly grind or bind thereupon.

The springs G G being placed on either side of the trolley fork and being slidably held within the guides $h$, $h$, both act to control the trolley fork when it is swung to either side. This permits the use of lighter and more flexible springs than would be permissible if either spring only acted in one direction, or than if a single spring were depended upon, and increases the flexibility of the trolley head and its capacity for adapting itself to the lateral angle or variations of the wire.

Having thus described our invention what we claim and desire to secure by Letters Patent of the United States, is:—

In a trolley-pole head, the combination of a rearwardly inclined shank provided with a vertically pierced male hinged-member having mitered shoulders forming side stops thereupon, a trolley fork having a trolley wheel mounted therein and being provided with vertically pierced female hinged-members having mitered shoulders forming side stops thereupon adapted to engage with the side stops on said male hinged-member to limit the swing of the trolley fork to less than a quarter turn to either side, a vertical pivot-pin connecting said hinged-members upon a line passing in close proximity to the forward edge of the trolley wheel, the trolley fork extending parallel to and slightly back of the line of the shank, and a flat spring rigidly secured on either side of said trolley shank extending horizontally past said hinged joint and having its free end slidably held within an external guide-loop on the side of the trolley fork.

GARRET MOTT.
ADOLPH G. KOENIG.

Witnesses:
WM. D. NEILLEY,
WILLIAM H. MOHR.